(12) United States Patent
Feng et al.

(10) Patent No.: US 8,481,153 B1
(45) Date of Patent: Jul. 9, 2013

(54) APPARATUS AND METHOD FOR IMPARTING WIDE ANGLE LOW REFLECTION ON CONDUCTIVE SURFACES

(75) Inventors: Simin Feng, Ridgecrest, CA (US); Mark B. Moran, Ridgecrest, CA (US); M. Joseph Roberts, Ridgecrest, CA (US); Linda F. Johnson, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 225 days.

(21) Appl. No.: 13/032,789

(22) Filed: Feb. 23, 2011

Related U.S. Application Data

(60) Provisional application No. 61/346,659, filed on May 20, 2010.

(51) Int. Cl.
  *B32B 15/04* (2006.01)
  *B32B 33/00* (2006.01)
  *G02B 1/00* (2006.01)

(52) U.S. Cl.
  USPC .................. 428/318.4; 428/457; 359/896

(58) Field of Classification Search
  None
  See application file for complete search history.

(56) References Cited

FOREIGN PATENT DOCUMENTS

WO    WO 2009120983 A2 * 10/2009

* cited by examiner

*Primary Examiner* — Ramsey Zacharia
(74) *Attorney, Agent, or Firm* — Charlene A. Haley; Christopher L. Blackburn

(57) ABSTRACT

An apparatus and method for imparting wide angle low reflection on any high reflective surfaces through resonant excitation of plasmonic leaky mode of a nanocavity.

23 Claims, 7 Drawing Sheets

APPARATUS AND METHOD FOR IMPARTING WIDE ANGLE LOW REFLECTION ON CONDUCTIVE SURFACES

CROSS-REFERENCE TO RELATED APPLICATIONS

This is a non-provisional patent application claiming benefit of parent provisional application filed in accordance with 35 U.S.C. 111(b), Ser. No. 61/346,659 filed on May 20, 2010, whereby the entire disclosures of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to apparatuses and methods for imparting wide angle low reflection of electromagnetic radiation on any high reflective surfaces.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Embodiments of the invention generally relate to apparatuses and methods for imparting wide angle low reflection on any high reflective surfaces.

The invention may be used for reducing the reflection of electromagnetic waves from any surfaces (metal, metal-alloy, transparent conductive oxides, metal-filled composites, inherently conducting polymers, graphite or graphene-filled composites, nanotube-filled composite, fullerene-filled composite) for Navy weapons and systems in air, gas, free space, gels, and liquids (including but not exclusively for example, water or gasoline).

Conventional anti-reflection coatings can become thicker and heavier for long wavelength of electromagnetic waves. In embodiments of the invention, metallic coatings are thinner and lighter than the conventional anti-reflection coatings and is easier to implement on any surfaces to reduce unwanted reflection.

Conventional anti-reflection optical coatings are made from quarter-wave stacks or gradient-index materials, typically constructed with all-dielectric materials. For such conventional coatings, the operational principle is based on either interference effect or adiabatic index matching technique. Conventional anti-reflection optical coating technology is described by Macleod [Thin Film Optical Filters $3^{rd}$ Edition, H. A. Macleod, 2001, Institute of Physics, London].

Figure 2A:
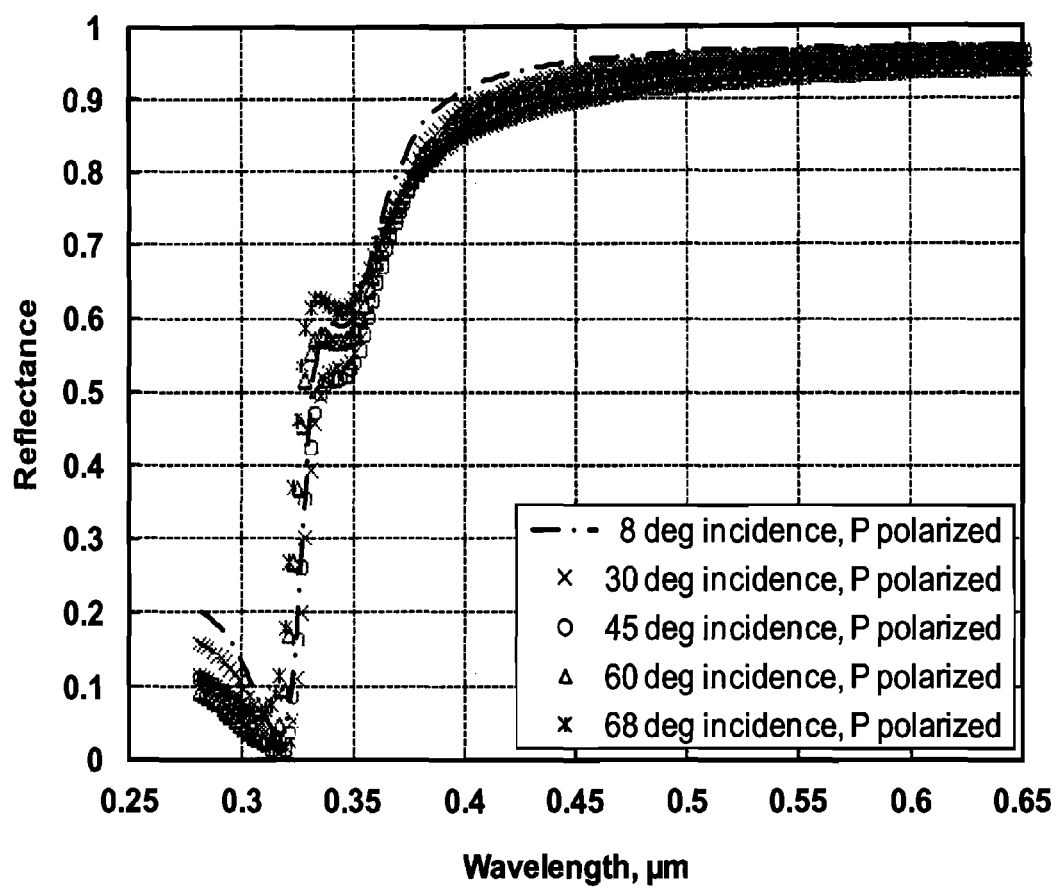
FIGS. 2A&B illustrate an experimental graph and simulation graph showing the reflectance of a silver surface vs wavelength of p-polarized light at different incidence angles, according to embodiments of the invention.
Figure 2B:
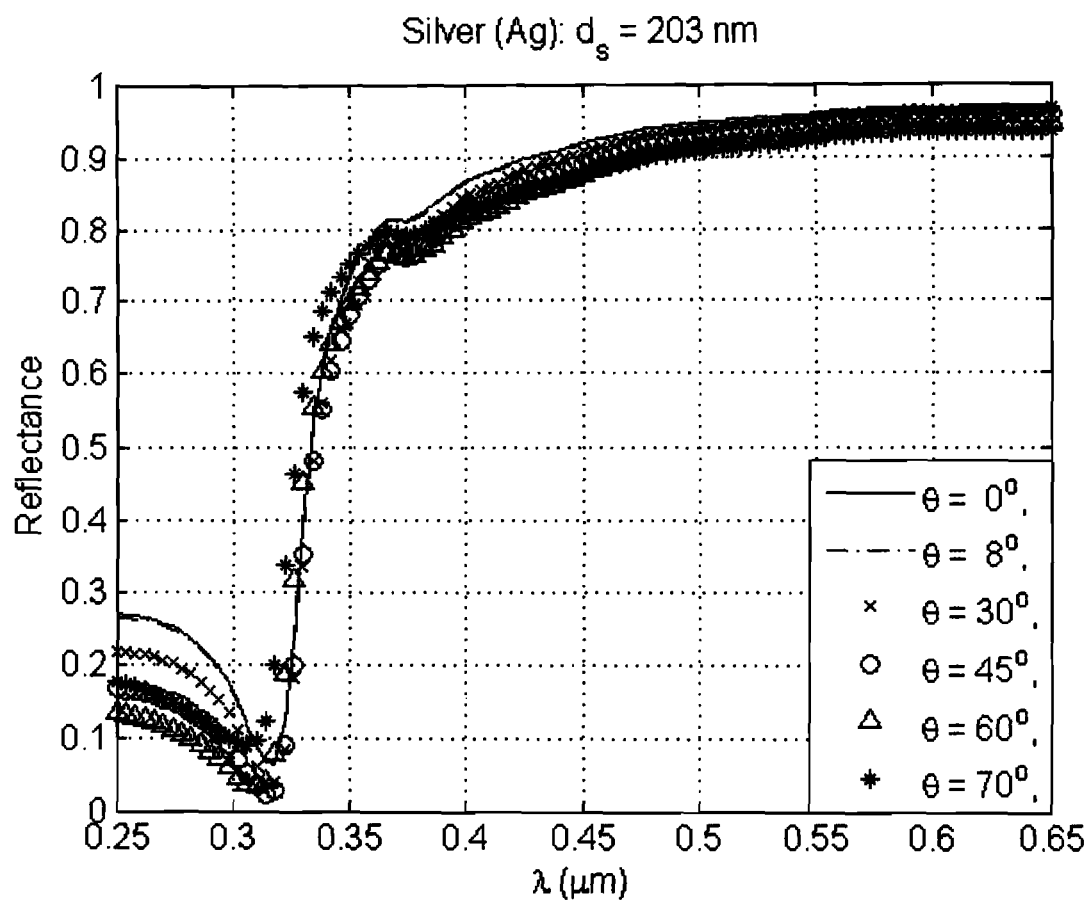
Figure 3A:
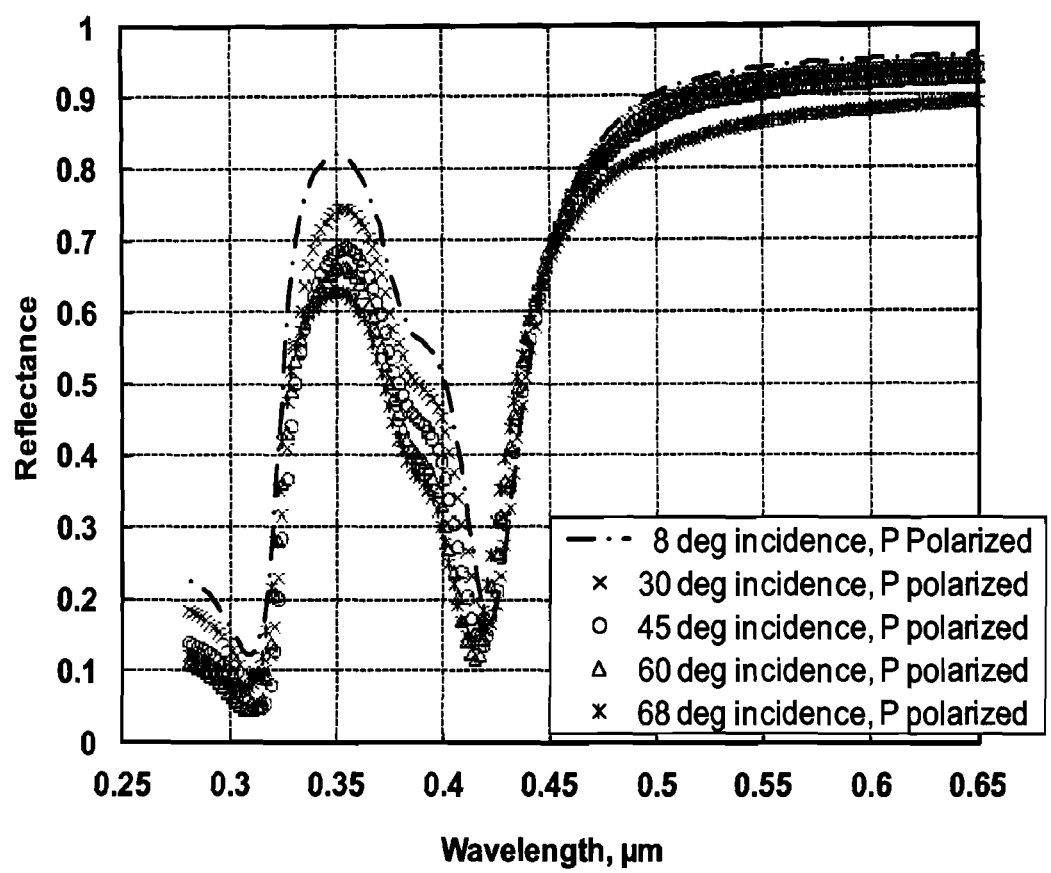
FIGS. 3A&B show Ag/APC/Ag: 30/91/203 nm illustrating an experimental and simulation graph, according to embodiments of the invention.
Figure 3B:
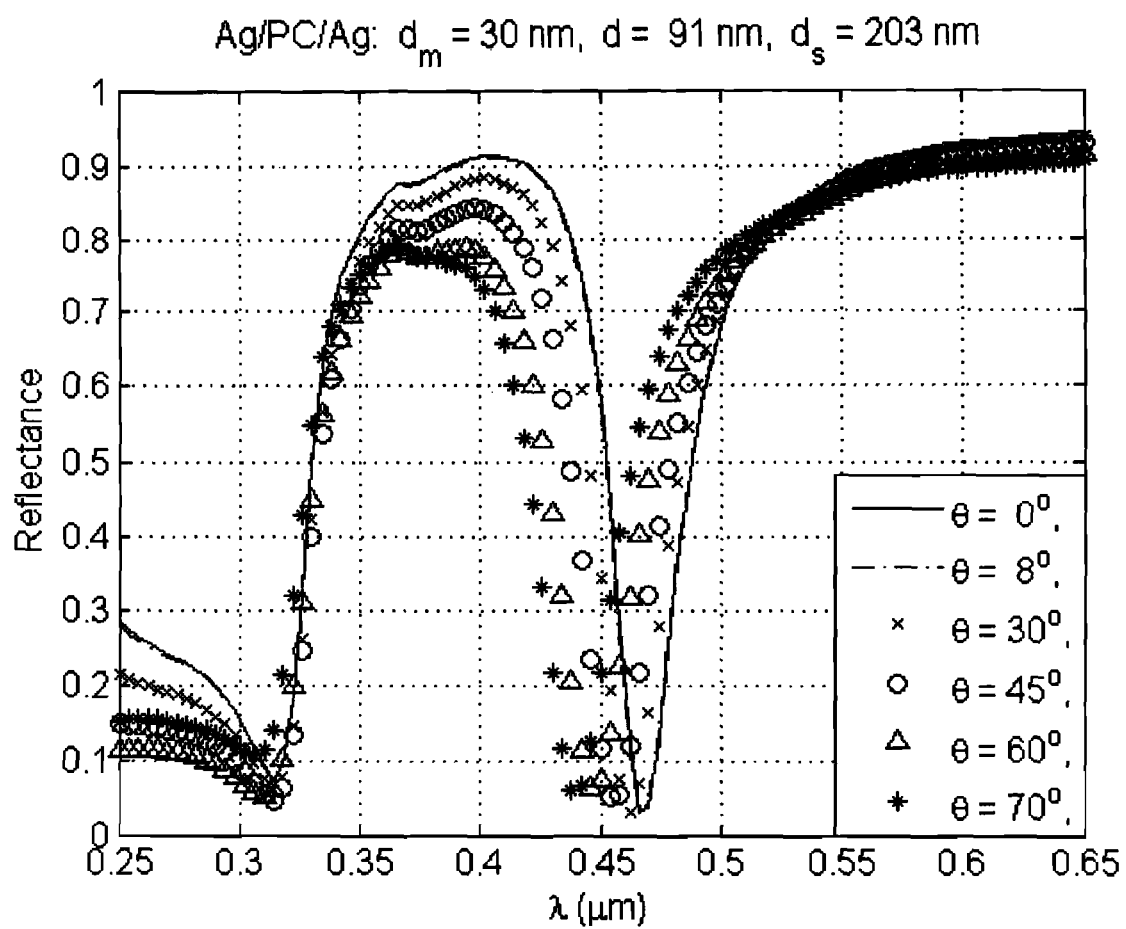
Figure 4A:
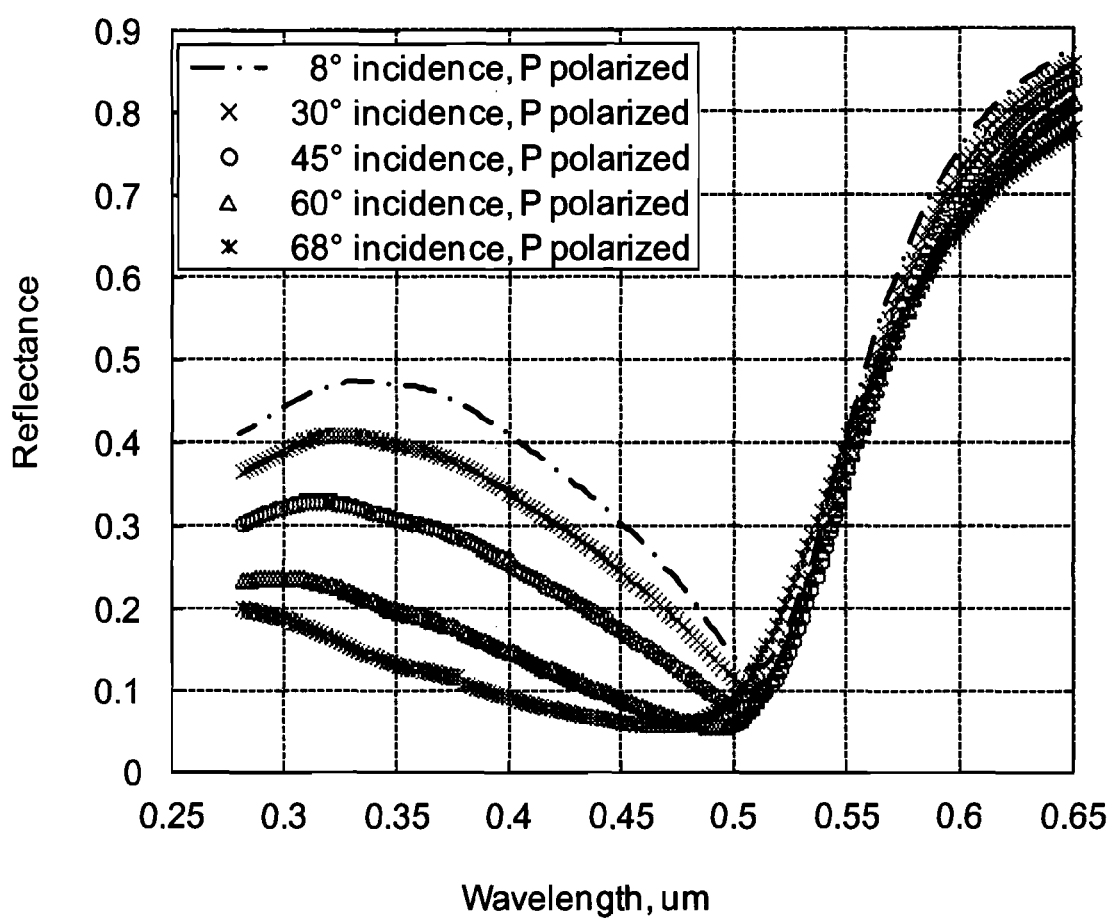
FIGS. 4A&B show Au/APC/Au: 25/79/203 nm illustrating an experimental and simulation graph, according to embodiments of the invention.
Figure 4B:
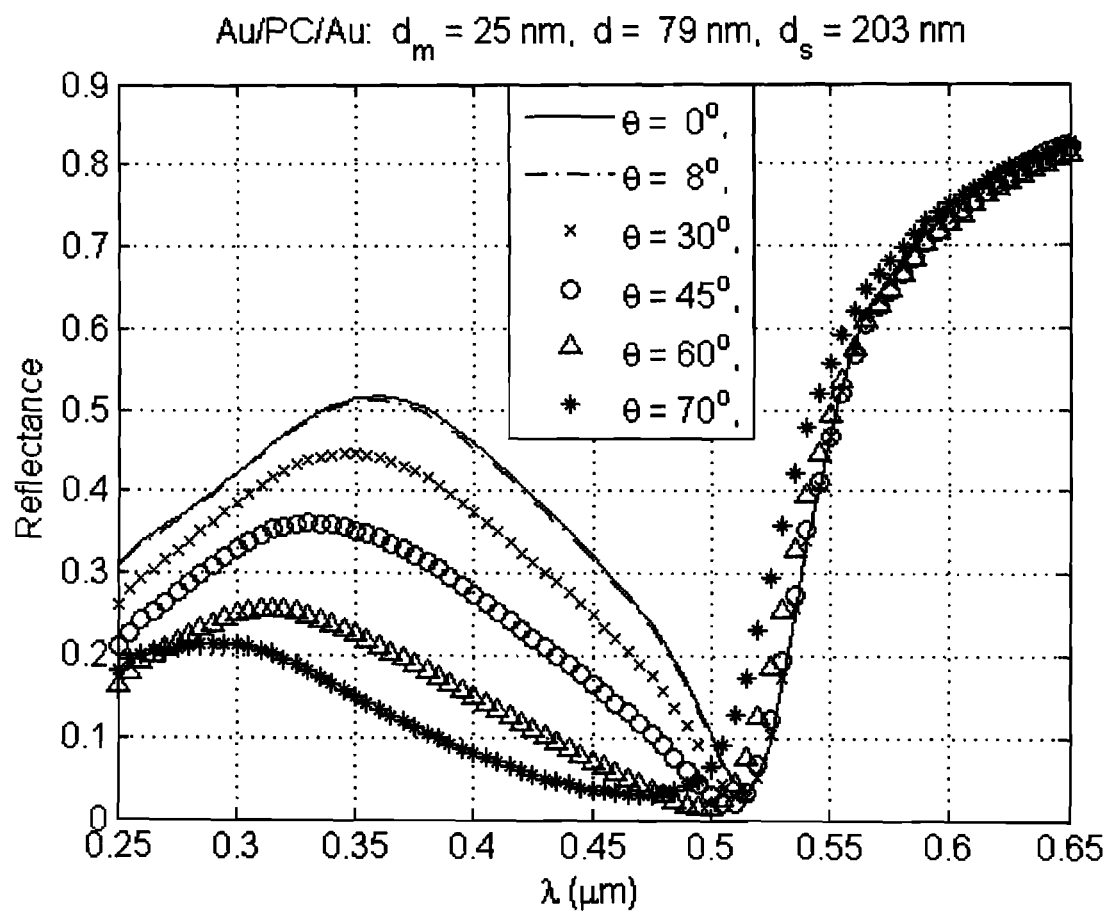

It is well-known that noble metals are good reflectors for electromagnetic waves of wavelength above 400 nm when the thickness of the metals is greater than 200 nm. Here, we demonstrate that with a simple modification, a good metallic mirror can be transformed into a "mirror" with a broad angle low reflection in optical regime—Weird Mirror Metamaterials. FIGS. 2 A&B illustrate an experimental graph and simulation graph showing the reflectance of silver surfaces vs wavelength of p-polarized light at different incidence angles. FIGS. 3A&B show Ag/APC/Ag: 30/91/203 nm illustrating an experimental and simulation graph. FIGS. 4A&B show Au/APC/Au: 25/79/203 nm illustrating an experimental and simulation graph with a different metal from FIG. 3.

Embodiments of the invention relate to a low reflective surface with coating including a reflective surface and a coating having at least one omnidirectional plasmonic leaky-mode resonance of nanocavity and a substrate, where the substrate and the surface are associated with and separated by at least one dielectric material (nanocavity), where the distance between each substrate is substantially equal and substantially uniform, the surface and the substrate are constructed of conductive-reflective material(s), and the dielectric material(s) is constructed of at least one effective insulating material, where the surface/dielectric material/substrate has a reflectance which is wavelength dependent with a minimum reflection of about 0% to about 20%.

The operational principles of embodiments of the invention are based on omnidirectional plasmonic leaky-mode resonance of nanocavity. This unique plasmonic nanocavity mode extends into free space, and thus it can be excited with an external light source. This principle leads to low reflection (0~20%) over broad incidence angle from 0 to 70 degree.

Another aspect of the invention relates to an anti-reflective coating having a reflective conductive surface being substantially smooth and having at least one omnidirectional plasmonic leaky-mode resonance of nanocavity, at least one dielectric material associated with the surface, where the dielectric material is constructed of at least one effective insulating material, and a conductive substrate associated with the dielectric material, where the dielectric material separates the substrate and the surface, where the distance between the surface and the substrate is substantially equal and substantially uniform, where the coated surface has a reflectance which is wavelength dependent with a minimum reflection of about 0% to about 20%.

In embodiments of the invention, the surface and the substrate are constructed of similar materials. In other embodiments, the surface and the substrate are constructed of different materials. In embodiments, the surface is constructed of materials selected from the group consisting of metal, metal alloy, transparent conductive oxides, metal-filled composites, inherently conducting polymers, graphite or graphene-filled composites, nanotube-filled composite, fullerene-filled composite, and any combination thereof. In other embodiments, the surface is constructed of gold, silver, and any combination of metal, metal alloy thereof. Yet in other embodiments, the substrate is constructed of metal or metal alloy. Still yet in other embodiments, the substrate is constructed of gold, silver, and any combination of metal, metal alloy thereof.

In embodiments of the invention, the dielectric material is constructed of at least one polycarbonate material. In embodiments, the dielectric material is deposited on the surface as a coating or film. In other embodiments, the dielectric material and the substrate is in the form of a film. Still yet in other embodiments, the dielectric material is constructed of any low-loss transparent material. One skilled in the art without undue experimentation would be able to understand and apply "any" low-loss transparent material and what they include.

In embodiments of the invention, the substrate has features that are smaller than the operation wavelength having at least one of bump(s), hole(s), flat surface, and grating(s).

Figure 1:
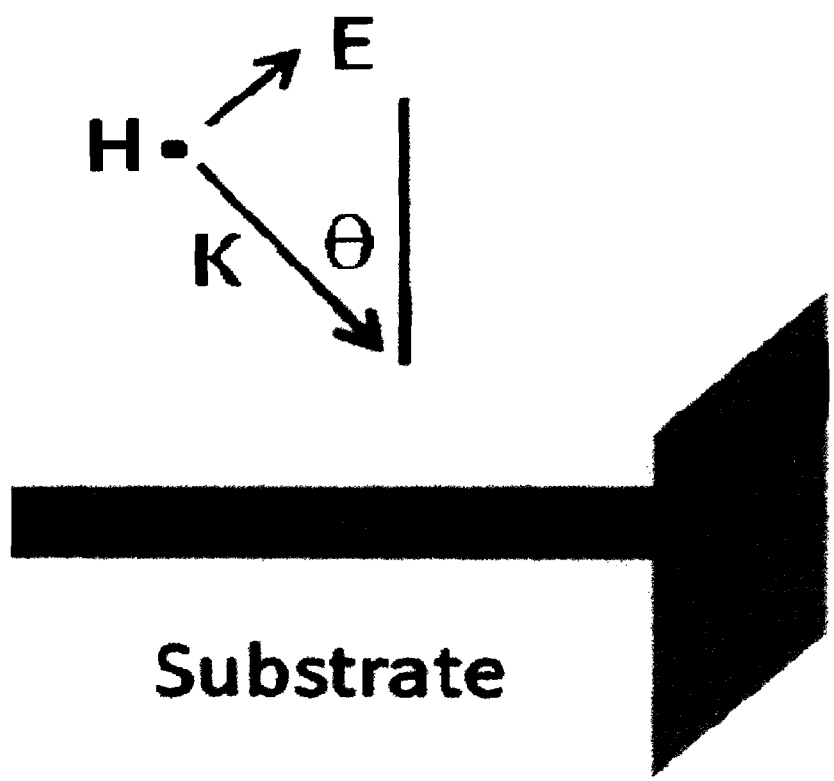
FIG. 1 illustrates a schematic drawing of the three-layer coating along with a incident light, according to embodiments of the invention; wherein E is electric field parallel to the plane of incidence, H is magnetic field perpendicular to the plane of incidence, k is the wave vector, and $\theta$ is the angle of incidence.

A properly constructed planar metallic nanocavity (FIG. 1) can exhibit an omnidirectional leaky-mode resonance. This particular plasmonic cavity mode extends into free space, and thus it can be excited with an external light source. By adding a thin layer of nanocavity on the top of the metallic mirror, the reflection behavior of the mirror can change dramatically. We fabricated the weird mirror metamaterials with a metal-insulator-metal configuration. By exciting this special plasmonic leaky mode, we have demonstrated experimentally and numerically a broad-angle low reflection in optical regime. A 10% reflection of the p-polarized electromagnetic wave is achieved at the wavelength 515 nm for Gold-Polycarbonate-Gold film and at the 425 nm for Silver-Polycarbonate-Silver film. When the incidence angle varies from normal to 70 degree, the central wavelength shifts about 10 nm. FIGS. 4A&B illustrate a nanocavity on the top of gold. What was simulated was Au/APC/Au: 25/79/203 nm.

In the case of prophetic examples, they are for illustration purposes only and not to be used to limit any of the embodiments.

By adding a thin layer of properly designed metallic nanocavity on the top of conductive surfaces, the reflection of the surface can be reduced dramatically from normal to wide-angle incidences. The top coating layer and underlying conductive surface forms a metal-insulator-metal (MIM) configuration. The top layer can be either flat or have any type of small features (such as, holes, bumps, and gratings) that are much smaller than the operation wavelength. The material of the top conductive surface can be either the same or different materials from that of the surface being protected. The middle layer of the nanocavity can be any dielectric materials.

Proof-of-principle experiments have been performed with a Metal-Insulator-Metal (MIM) configuration on several thin films. The experimental measurements and simulation results match very well. Electromagnetic reflection from metallic surfaces can be reduced from 90% to 10% has be demonstrated experimentally and numerically.

Simulation:

The details such as dimension of each layer are guided by numerical simulation using realistic material dispersive dielectric constants. Computer codes were developed in house using MatLab software. The principle of numerical simulation is based on solving Maxwell's equations in a multilayer configuration and applying the scattering and transfer matrix technique to anisotropic materials.

Fabrication:

Fabricated was Gold-Polycarbonate-Gold thin film and Silver-Polycarbonate-Silver (S-P-S) MIM thin film. The following procedure was used to fabricate a S-P-S film with nominal layer thicknesses of 200 nm Ag, 100 nm polycarbonate, and 30 nm of Ag.

Substrates were 25 mm diameter 0.3 mm thick circular microscope cover slips (Van-Labs). The glass substrates were cleaned by ultrasound for 1 minute in Micro-90 Critical Cleaning solution (International Products Corp), followed by multiple rinses with ultrapure water. Silver layer was formed by sputtering from a silver target (99.99%, Ted Pella, Inc) using a Cressington 108 Auto sputter coater with MTM-10 Thickness Monitor.

The polycarbonate layer was made by spin coating Amorphous Polycarbonate (APC); namely, a 2 wt % solution of poly(bisphenol A carbonate-co-4,4'-(3,3,5-trimethylcyclohexylidene diphenol) (from Aldrich) in chlorobenzene. The polymer films were baked in nitrogen atmosphere using a programmable oven (SO-LOW Environmental Equipment Model OP325-2A) by ramping temperature from ambient to 115° C. at 4° C./min, holding for 40 min, and ramping down to ambient at 2° C./min.

Measurement:

Film thickness was measured using a Veeco DI3100 AFM in tapping mode. Reflectance spectroscopy was performed using a Perkin Elmer Universal Reflectance Accessory on a Lambda 950 UV VIS-NIR spectrophotometer.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:
1. A low reflective surface coating, comprising:
  a conductive coating surface layer constructed of materials selected from the group consisting of metal, metal alloy, transparent conductive oxides, metal-filled composites, inherently conductive polymers, graphite or graphene-filled composites, nanotube-filled composite, fullerene-filled composite, and any combination thereof;
  at least one dielectric layer formed of a dielectric material;
  a substrate formed of conductive metallic material, wherein said substrate and said conductive coating surface layer are associated with and separated by said dielectric layer, wherein the distance between said substrate and said conductive coating surface layer is substantially equal and substantially uniform;

wherein said low reflectance surface coating exhibits a reflectance which is wavelength dependent with a minimum reflection within a range of about 0% to about 20%; and wherein said conductive coating surface layer, said dielectric layer, and said substrate form a nanocavity exhibiting omnidirectional plasmonic leaky mode resonance.

2. The low reflective surface coating according to claim 1, wherein said conductive coating surface layer and said substrate are constructed of identical materials.

3. The low reflective surface coating according to claim 1, wherein said conductive coating surface layer and said substrate are constructed of different materials.

4. The low reflective surface coating according to claim 1, wherein said conductive coating surface layer is constructed of a gold and/or silver alloy.

5. The low reflective surface coating according to claim 1, wherein said substrate is constructed of gold, silver, and any combination of metal, metal alloy thereof.

6. The low reflective surface coating according to claim 1, wherein said dielectric material is constructed of a transparent material.

7. The low reflective surface coating according to claim 1, wherein said dielectric material is deposited on said substrate as a coating or film.

8. The low reflective surface coating according to claim 1, wherein said dielectric material and said substrate is in the form of a film.

9. The low reflective surface coating according to claim 1, wherein said substrate having features that are smaller than the operation wavelength comprising at least one of bump(s), hole(s), flat surface, and grating(s).

10. The low reflective surface coating according to claim 1, wherein said dielectric material(s) is constructed of at least one insulating material.

11. The low reflective surface coating according to claim 1, wherein said conductive coating surface layer is constructed of gold or a gold alloy.

12. The low reflective surface coating according to claim 1, wherein said conductive coating surface layer is constructed of silver or a silver alloy.

13. An anti-reflective coating, comprising:

a coating having a reflective conductive surface being substantially smooth and constructed of materials selected from the group consisting of metal, metal alloy, transparent conductive oxide, metal-filled composites, inherently conductive polymers, graphite or graphene-filled composites, nanotube-filled composite, fullerene-filled composite, and any combination thereof, wherein said coating having at least one omnidirectional plasmonic leaky-mode resonance of nanocavity;

at least one dielectric material associated with said surface; and a conductive substrate formed of metal and/or metal alloy associated with said dielectric material, wherein said dielectric material separates said substrate and said surface, wherein a distance between said surface and said substrate is substantially equal and substantially uniform, wherein said coating exhibits a reflectance which is wavelength dependent with a minimum reflectance within a range of about 0% to about 20%.

14. The coating according to claim 13, wherein said surface and said substrate are constructed of identical materials.

15. The coating according to claim 13, wherein said surface and said substrate are constructed of different materials.

16. The coating according to claim 13, wherein said surface is constructed of a gold or silver alloy.

17. The coating according to claim 13, wherein said substrate is constructed of gold, silver, and any combination of metal, metal alloy thereof.

18. The coating according to claim 13, wherein said dielectric material is constructed of a transparent material.

19. The coating according to claim 13, wherein said dielectric material is deposited on said substrate as a film.

20. The coating according to claim 13, wherein said dielectric material and said substrate is in the form of a film.

21. The coating according to claim 13, wherein said substrate having features that are smaller than the operation wavelength comprising at least one of bump(s), hole(s), flat surface, and grating(s).

22. The coating according to claim 13, wherein said surface is constructed of gold or a gold alloy.

23. The coating according to claim 13, wherein said surface is constructed of silver or a silver alloy.

* * * * *